United States Patent
Kates et al.

(10) Patent No.: US 6,218,815 B1
(45) Date of Patent: Apr. 17, 2001

(54) METHOD AND APPARATUS FOR A MULTIPLE STAGE SEQUENTIAL SYNCHRONOUS REGULATOR

(75) Inventors: Barry K. Kates, Austin; Edward P. Sheehan, Jr., Georgetown, both of TX (US)

(73) Assignee: Dell USA, D.P., Round Rock, TX (US)

( * ) Notice: Subject to any disclaimer, the term of this patent is extended or adjusted under 35 U.S.C. 154(b) by 0 days.

(21) Appl. No.: 09/426,482

(22) Filed: Oct. 26, 1999

Related U.S. Application Data

(63) Continuation of application No. 08/905,837, filed on Aug. 4, 1997, now Pat. No. 5,973,485, which is a continuation of application No. 08/496,233, filed on Jun. 28, 1995, now abandoned.

(51) Int. Cl.[7] .................... G05F 1/40; G05F 1/44; G05F 1/573
(52) U.S. Cl. .................... 323/272; 363/65; 323/283
(58) Field of Search .................... 363/56, 65; 323/272, 323/282, 283, 271

(56) References Cited

U.S. PATENT DOCUMENTS

| | | | |
|---|---|---|---|
| 4,290,101 | * 9/1981 | Hergenham | 363/65 |
| 4,404,623 | * 9/1983 | Jourdan | 363/56 |
| 4,727,469 | * 2/1988 | Kammiller | 363/56 |
| 4,766,364 | * 8/1988 | Biamonte et al. | 323/273 |
| 4,947,101 | * 8/1990 | McVey | 323/272 |
| 5,227,961 | * 7/1993 | Claydon et al. | 363/17 |
| 5,414,341 | * 5/1995 | Brown | 323/268 |
| 5,629,608 | * 5/1997 | Budelman | 323/268 |
| 5,687,067 | * 11/1997 | Majid et al. | 363/97 |
| 5,847,554 | * 12/1998 | Wilcox et al. | 323/282 |

* cited by examiner

Primary Examiner—Peter S. Wong
Assistant Examiner—Bao Q. Vu
(74) Attorney, Agent, or Firm—Skjerven Morrill MacPherson LLP

(57) ABSTRACT

A multiple stage sequential synchronous regulator including multiple switch stages activated in a sequential manner to reduce the frequency, stress and power loss per stage. In the preferred embodiment, each stage is implemented using buck regulator topology including an inductor and two synchronous switches, preferably comprising MOSFETs. A sequential logic circuit asserts corresponding enable signals to activate each of the stages one at a time in sequential manner. Each stage also receives a pulse width modulated (PWM) signal for activating the first synchronous switch during a power phase and then activating the second synchronous switch during a flux reversal phase for the enabled stage. The time sharing of multiple stages reduces the average current per stage and allows increased utilization of the switching parts per stage. Thus, the typically large and expensive power inductors and switches are replaced with significantly smaller, lighter and cheaper components. Furthermore, each switched device can be pushed past its rated limits due to smaller average current, thereby increasing the efficiency of each of the parts. A single output capacitor is coupled to all of the stages for filtering the output voltage. The output capacitor can remain small since it sees the cumulative frequency of all of the switch stages combined.

4 Claims, 4 Drawing Sheets

METHOD AND APPARATUS FOR A MULTIPLE STAGE SEQUENTIAL SYNCHRONOUS REGULATOR

This patent is a continuation of U.S. patent application Ser. No. 08/905,837, filed Aug. 4, 1997, now U.S. Pat. No. 5,973,485, which is a continuation of U.S. patent application Ser. No. 08/496,233, filed Jun. 28, 1995, now abandoned.

FIELD OF THE INVENTION

The present invention relates to regulators, and more particularly to a multiple stage synchronous regulator, where each stage is activated in a sequential manner.

DESCRIPTION OF THE RELATED ART

DC to DC regulators are generally used to convert an unregulated DC voltage to a regulated DC voltage. Such regulators are widely used in switch mode DC power supplies for generating the appropriate DC voltage signals on the system board and option cards of a computer system. The two most common types of DC to DC regulator topologies include buck and boost topologies. In both buck and boost topologies, an oscillator type circuit, such as a pulse width modulator, turns on and off a primary power switch driving current from the unregulated DC source voltage through a choke inductor or transformer to develop an output voltage. In the buck regulator circuit, when the primary switch is turned on, the source voltage is coupled to the load through the inductor and when the primary switch is turned off, the load current flows through a free-wheeling rectifier or diode. The buck regulator is commonly used to step-down the voltage of the unregulated source. In a boost regulator circuit, the primary switch is turned on to apply power to an inductor or transformer for storing energy and is turned off to release the stored energy to the output circuit and load. The boost regulator is often used to increase the voltage level at the output. The present invention is illustrated using a buck type regulator, although it is applicable for boost and other regulator topologies.

Synchronous DC to DC regulation is often used to improve the efficiency and performance of DC to DC converters by reducing losses in the power switches or diodes. In general, two switches are synchronized so that one switch is turned on while the second is off, and vice versa. In particular, a primary switch is turned on while the second switch is turned off during a first portion of each cycle to provide power, and then the primary switch is turned off and the synchronous switch is turned on during a flux reversal portion of each cycle to free-wheel load current or to otherwise release stored energy to the output. Generally, the standard method of achieving an active switch instead of a passive diode in low voltage, high current DC to DC regulators is to use a power metal-oxide-semiconductor field-effect transistor (MOSFET). Typically, dual synchronous MOSFETs are driven by a pulse width modulated (PWM) circuit which controls each cycle based on a feedback input.

Typical regulators have a single stage switching system or linear regulator system where the average power density is on the order of ten watts per cubic inch ($10 \text{ W/in}^3$). Although several factors are responsible for limiting the practicable power density achievable, one of the more important factors is the frequency of operation. In fact, the amount of power loss is proportional to the frequency of the regulator. A typical single stage regulator uses a primary power inductor which is designed according to precise specifications in order to reduce power loss and heat generation as much as possible for particular frequency ranges. The inductor is required to have relatively low losses in its core and copper winding and further requires substantial shielding to achieve a high rating, thereby resulting in a relatively large and expensive part. A similar analysis applies to the switching transistors, which are almost invariably large and expensive MOSFETs at the desired frequency of operation. MOSFETs usually have relatively high switching losses due to high gate capacitance. Also, to achieve the desired drain to source resistance, a significant amount of silicon is used, resulting in a relatively large part.

Thus, the power loss for both switching FETs and power inductors for typical switching regulators is increased with increasing frequency. However, a higher frequency is desired to reduce the resulting ripple voltage at the output to achieve the desired regulation. The output load or filter capacitor increases in size with increases of output ripple voltage, which decreases with increased frequency. Therefore, a higher frequency at the output allows a smaller load capacitor since the capacitor is switched at a higher rate and thus requires less storage per cycle. Yet because of the power loss limitations of the switching FET and power inductors, the capacitor must usually be a relatively large and costly part at the practical frequency ranges of operation.

In this manner, typical single stage switching regulators use fairly large switching components and filter capacitors in order to reduce the power losses and to increase the efficiency to achieve the desired or necessary voltage regulation.

SUMMARY OF THE INVENTION

A multiple stage sequential synchronous regulator according to the present invention includes a plurality of switching stages activated sequentially to reduce the amount of stress applied to each stage. Multiple stages further reduce the effective frequency per stage, thereby reducing the power loss of each stage. The time sharing of several stages reduces the average current per stage and allows increased utilization of each of the switching parts. In this manner, the switching transistors and power inductors are replaced with several significantly smaller, lighter and cheaper components.

Furthermore, each switching part can be pushed past its rated limits due to smaller average current, thereby increasing the efficiency of the parts. The cumulative result is a smaller, lighter and cheaper voltage regulator capable of processing a much greater amount of power, which further results in a dramatic increase in power density.

A regulator according to the present invention includes a sequential drive system including a plurality of switch stages for converting an unregulated DC voltage to a regulated output voltage according to a modulated signal. A logic circuit sequentially selects the switch stages on consecutive cycles of the modulated signal. Each of the switch stages preferably includes synchronous switches coupled to an inductor, where a first switch is activated to initiate a power phase and a second switch is activated to activate a flux reversal phase of the inductor when that stage is selected. In this manner, two stages effectively decrease the frequency stress applied to each stage by a factor of two. Correspondingly, n stages decrease the stress applied to each stage by a factor of n. However, since each stage is coupled to the output, the output capacitor sees the combined frequency of all the stages.

In the preferred embodiment, a sequential logic circuit asserts sequential enable signals to corresponding synchronous switching stages. Each stage includes preferably two amplifiers for driving a power switch and a flux reversal switch, respectively, to implement the power and flux reversal stages for each cycle. Each pair of switches activates current through a corresponding output inductor, where all of the output inductors are connected together and to a single output filter capacitor. Thus, the effective frequency of the switching amplifiers, switching transistors and output inductors is proportionately reduced by the number of stages, thereby substantially reducing the power loss in each stage. Furthermore, the output capacitor is exposed to the cumulative frequency, which can be significantly higher than a single stage embodiment. Thus, the output capacitor may therefore be reduced in size.

In this manner, the overall switching regulator is smaller, less expensive and capable of providing substantially more power. In fact, use of the present invention allows a 3.3V regulator capable of supplying 20 amperes (A) to be implemented in a package less than one cubic inch, thereby resulting in a power density of at least 66 W/in$^3$. This is a substantial improvement over prior art, which is typically on the order of 10 W/in$^3$. Further, the cost of all of the switching components for a four stage regulator is substantially less than a comparable single-stage amplifier requiring expensive inductors and switching transistors.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
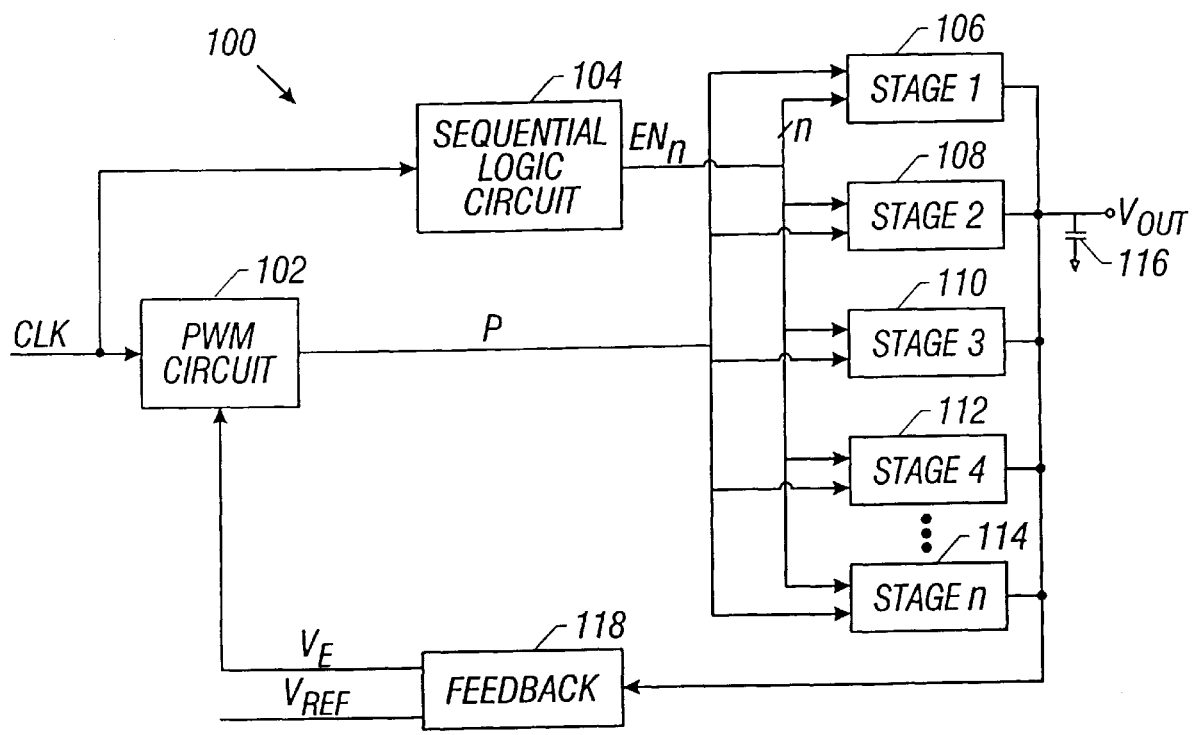
FIG. 1 is a block diagram of a multiple stage sequential synchronous regulator according to the present invention.

Referring now to FIG. 1, a block diagram is shown of a multiple stage sequential synchronous regulator 100 according to the present invention. A primary clock signal CLK is provided to the input of a pulse width modulation (PWM) circuit 102 and to the input of a sequential logic circuit 104. The PWM circuit 102 provides a PWM signal P to the input of n sequential stages 106, 108, 110, 112 and 114, where n is an integer. An unregulated DC input voltage, referred to as $V_{IN}$, is provided to each of the n stages 106, 108, 110, 112 and 114, which also receive a corresponding enable input $EN_m$, where m is an integer from 1 to n. In particular, the first stage 106 receives an enable signal $EN_1$, the second stage 108 receives an enable signal $EN_2$, the third stage 110 receives an enable signal $EN_3$, the fourth stage 112 receives an enable signal $EN_4$, and so on up to the nth stage 114, which receives an enable signal $EN_n$. The combined outputs of each of the n stages develop the output voltage, referred to as $V_{OUT}$, which is preferably filtered across a single load capacitor 116. The $V_{OUT}$ signal is sensed by a feedback circuit 118 which receives a reference signal $V_{REF}$ and develops an error signal $V_E$, which is provided to the PWM circuit 102.

Operation of the regulator 100 is now described. The feedback circuit 118 compares the $V_{OUT}$ signal with the $V_{REF}$ signal and asserts the error signal $V_E$ for purposes of feedback regulation. The PWM circuit 102 receives the CLK signal and provides the modulated P signal preferably at a fixed frequency, but having a duty cycle based upon the $V_E$ error signal. In general, the duty cycle of the P signal is increased as the magnitude of the $V_E$ signal increases. The sequential logic circuit 104 enables the n stages 106–114 one at a time in a sequential manner for each cycle of the CLK signal. In particular, during a first cycle of the CLK signal, the first stage 106 is enabled, and upon the next pulse of the CLK signal, the second stage 108 is enabled, and so on, where the n stages 106, 108, 110, 112 and 114 are activated one at a time upon consecutive cycles of the CLK signal. After the nth stage 114 is activated, the sequential logic circuit 104 returns to the first stage 106. It is noted, however, that the n stages 106–114 may be activated in any order without affecting overall operation.

In the preferred embodiment, each of the plurality of stages 106–114 are implemented in a Buck topology fashion including a first switch and power inductor for coupling the $V_{IN}$ signal through the inductor to the $V_{OUT}$ signal, and a second switch for allowing free wheel current to flow due to flux reversal of the inductor for developing the $V_{OUT}$ signal. For each stage, a power portion of each cycle occurs while the P signal is asserted high and a flux reversal portion occurs while the P signal is de-asserted low. It is easily seen that since the sequential logic circuit 104 activates only one of the n stages 106–114 at a time in a sequential manner, the effective frequency ($F_{EFF}$) for each of the stages is the frequency of the CLK signal divided by n. Thus, the effective frequency $F_{EFF}$ for each of the stages 106–114 is a factor n lower and the CLK signal, which is the overall operating frequency of the regulator 100. In this manner, the regulator 100 has the benefit of reducing the effective frequency $F_{EFF}$ for the switching devices in each of the stages, thereby dramatically reducing the power loss per stage.

Furthermore, all of the stages 106–114 are coupled to the output and across the output capacitor 116 so that the capacitor 116 sees the combined frequency of all of the stages 106–114, where this frequency is approximately equal to the frequency of the CLK signal. Thus, the benefits of high frequency are maintained since the ripple voltage across the capacitor 116 is reduced due to the effective frequency of the ripple voltage at the output, so that the size of the output capacitor 116 is substantially reduced.

Although not readily apparent, the regulator circuit 100 has several cumulative benefits as compared to a single-stage regulator of prior art. At first, it would appear that the cost is substantial to implement a plurality of switching stages. In practice, however, it has been discovered that substantially smaller and significantly less components can be used for each of the stages 106–114, so that the cumulative size and cost is substantially reduced as compared to a prior, single-stage regulator. In particular, significantly smaller and cheaper inductors can be used for each of the stages 106–114, where each inductor costs less than one-tenth the cost of a single-stage, sophisticated inductor of prior art. For example, if a single-stage inductor costs $10, the inductors in each of the stages 106–114 cost less than $1.

The same is true for the switching transistors or MOSFETs used in each of the stages 106–114, where the cumulative cost of the cheaper components is substantially cheaper and significantly smaller than the dual, high power MOSFETs used in single stage regulators of prior art.

Figure 2A:
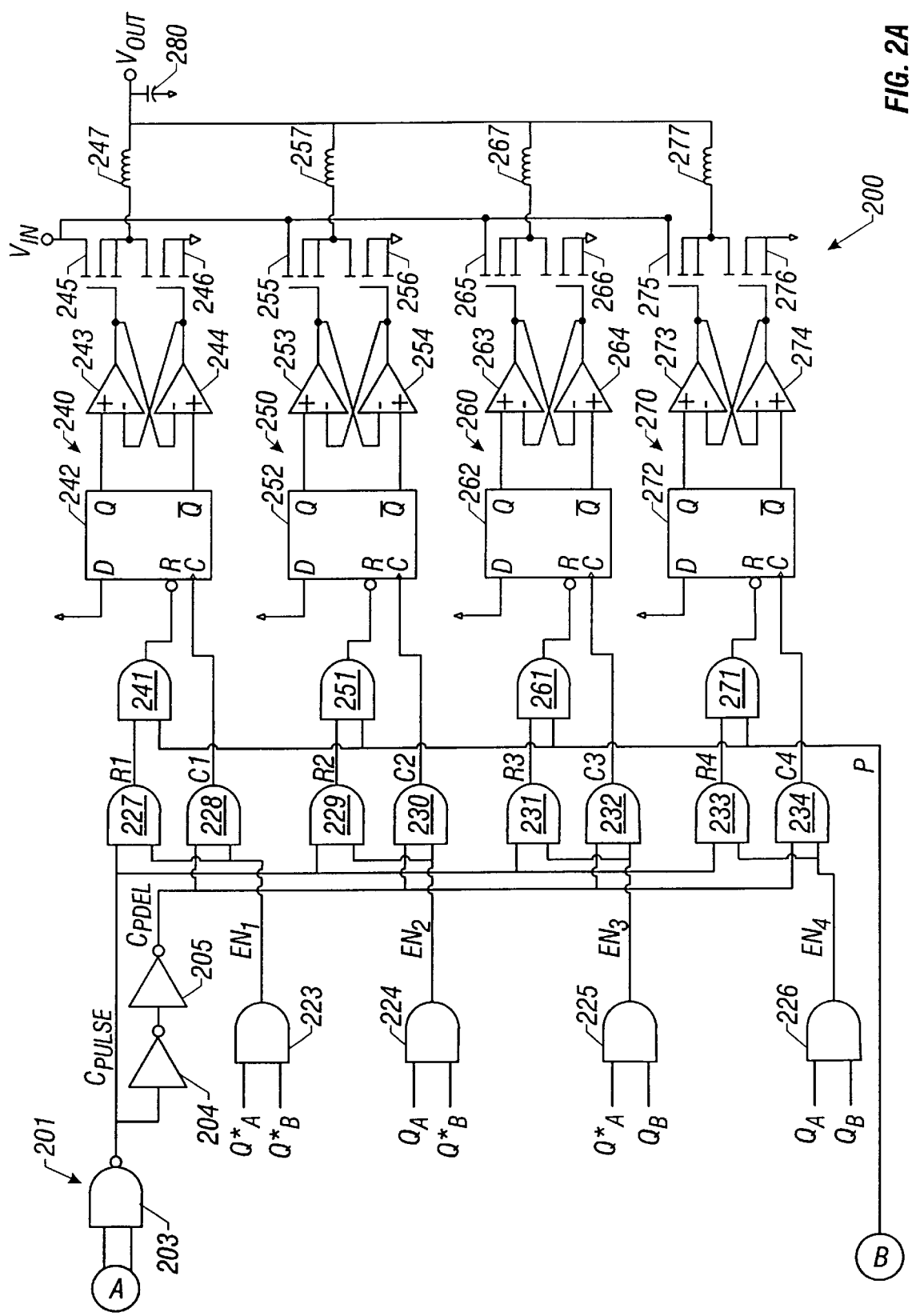
FIG. 2 is a more detailed diagram of a regulator according to the present invention.
Figure 2B:
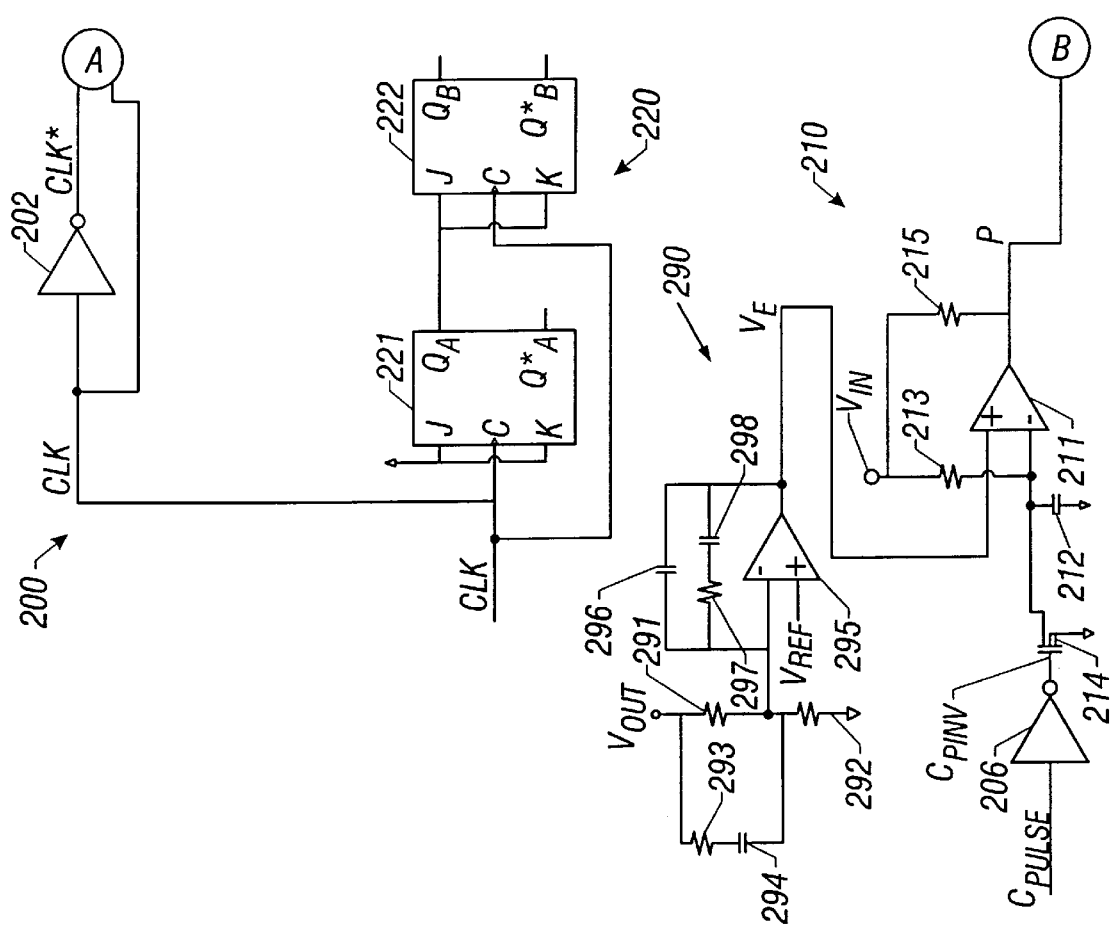

Furthermore, by time-sharing several stages, each individual stage can process approximately thirty percent more power than it could if it was used as a single stage. This percentage increases by a certain amount each time a new stage is added. In the preferred embodiment, four stages provides a substantial reduction in cost and increase in efficiency to achieve the desired power density, although more or less stages can be used as desired. Referring now to FIG. 2, a more detailed schematic diagram is shown of a more specific multiple stage, sequential, synchronous regulator 200 according to the present invention. The input CLK signal is first provided to a pulse shaper circuit 201 for providing a very high duty cycle pulse signal, referred to as $C_{PULSE}$ at its output. In particular, the CLK signal is provided to the input of an inverter 202, having its output asserting an inverted CLK* signal, which is provided to one input of a two-input NAND gate 203, which receives the CLK signal at its other input The output of NAND gate 203 provides the $C_{PULSE}$ signal, which preferably has a very high duty cycle on the order of ninety-nine percent. For purposes described below, the $C_{PULSE}$ signal is delayed using two series inverters 204, 205 for providing a slightly delayed version of the $C_{PULSE}$ signal referred to as $C_{PDEL}$. In particular, the $C_{PULSE}$ signal is provided to the input of an inverter 204 having its output connected to the input of another inverter 205, which provides the $C_{PDEL}$ signal at its output. The $C_{PULSE}$ signal is low for the duration of the delays through the inverter 202 and NAND gate 203 for each cycle of the CLK signal, but is otherwise high and has the same frequency as the CLK signal.

The $C_{PULSE}$ signal is provided to the input of an inverter 206 having its output providing an inverted $C_{PULSE}$ signal, referred to as $C_{PINV}$, to the one input of a PWM circuit 210. The $C_{PINV}$ signal is simply an inverted version of the $C_{PULSE}$ signal, preferably having a duty cycle of approximately one percent The PWM circuit 210 is primarily based upon a comparator 211 having its inverted input coupled to one end of a capacitor 212 and to one end of a resistor 213. The other end of the resistor 213 is connected to the $V_{IN}$ signal and the other end of the capacitor 212 is connected to ground. The inverted input of comparator 211 is also connected to the drain of a field-effect transistor (FET) 214, having its source connected to ground and its gate receiving the $C_{PINV}$ signal. The $V_{IN}$ signal is also connected to one end of a pull-up resistor 215, having its other end connected to the output of the comparator 211. The non-inverting input of the comparator 211 receives the $V_E$ signal.

Operation of the PWM circuit 210 is as follows. A pulse on the $C_{PINV}$ signal activates the FET 214, which discharges the capacitor 212 so that the comparator 211 asserts the P signal high, pulled up through the resistor 215. When the $C_{PINV}$ signal goes low, the FET 214 is turned off, and the capacitor 212 charges through resistor 213 in a linear manner, providing a ramp function. Eventually the ramp voltage to the comparator 211 becomes equal to and surpasses the $V_E$ signal, so that the comparator 211 deasserts the P signal low. In this manner, the P signal generally has the same frequency as the CLK signal, but has a duty cycle based upon the $V_E$ signal.

A sequential logic circuit is formed by implementing a clock divider circuit 220, which further includes a couple of sequentially connected A and B flip-flops 221, 222 for developing divide-by-two and divide-by-four outputs. A frequency divider circuit can be implemented in a plurality of ways, but in the embodiment shown, the divider 220 includes two JK-type flip-flops 221, 222. In particular, the CLK signal is provided to the clock inputs of both of the flip-flops 221, 222 so that they are clocked at the same time for purposes of synchronization. The J and K inputs of the flip-flop 221 are pulled high so that the flip-flop 221 toggles with each cycle of the CLK signal, thereby performing a divide-by-two function. The non-inverted Q output of the flip-flop 221, referred to as $Q_A$, is provided to both J and K inputs of the flip-flop 222, which performs a divide-by-four function. The inverted Q output of the flip-flop 221 is referred to as $Q^*_A$. The outputs of the flip-flop 222 are $Q_B$ and $Q^*_B$. It is noted that the inverted outputs are shown with a bar above the Q in the Figures, although in this disclosure an asterisk (*) is used to indicate negative logic. The clock divider circuit 220 provides four signals, including a divide-by-two signal $Q_A$ and its inverted counterpart $Q^*_A$, as well as two divide-by-four signals $Q_B$ and its inverted counterpart $Q^*_B$. These signals are combined through four two-input AND gates 223, 224, 225 and 226 for developing four enable signals, $EN_1$, $EN_2$, $EN_3$ and EN4, for sequentially activating power stages 240, 250, 260 and 270, respectively, of the regulator 200. More particularly, the $Q^*_A$ and $Q^*_B$ signals are provided to the inputs of the AND gate 223, which provides the $EN_1$ signal; the $Q_A$ and $Q^*_B$ signals are provided to the two inputs of AND gate 224, which provides the $EN_2$ signal; the $Q^*_A$ and $Q_B$ signals are provided to the two inputs of AND gate 225, which provides the $EN_3$ signal; and the $Q_A$ and $Q_B$ signals are provided to the two inputs of AND gate 226, which provides the $EN_4$ signal.

The $C_{PULSE}$ signal is provided to one input of four two-input AND gates 227, 229, 231 and 233, and the $C_{PDEL}$ signal is provided to one input of four AND gates 228, 230, 232 and 234. The $EN_1$, signal is provided to the other input of the AND gates 227 and 228, the $EN_2$ signal is provided to the other inputs of the AND gates 229 and 230, the $EN_3$ signal is provided to the other input of the two AND gates 231 and 232, and the $EN_4$ signal is provided to the other input of the AND gates 233 and 234. In this manner, each of the AND gates 227, 229, 231 and 233 assert reset signals R1, R2, R3 and R4, respectively, to the switching stages 240, 250, 260 and 270, respectively, of the regulator 200. The AND gates 228, 230, 232, and 234 provide clock signals C1, C2, C3 and C4 to each of the stages 240, 250, 260 and 270, respectively. It is noted that the C1–C4 signals are asserted after the R1–R4 signals, respectively, due to the delay of the inverters 204, 205.

Each of the stages 240, 250, 260 and 270 includes a two-input AND gate 241, 251, 261 and 271, respectively, each having one input receiving the reset signals R1, R2, R3 and R4, respectively, and another input receiving the P signal from PWM circuit 210. The outputs of the AND gates 241, 251, 261, 271 are provided to the inverted reset inputs of D-type latches 242, 252, 262 and 272, respectively, within each of the stages 240, 250, 260 and 270. The C1, C2, C3 and C4 signals are provided to the respective clock inputs of the latches 242, 252, 262 and 272, where each of these latches are preferably D-type flip-flops receiving a logic one at their D inputs.

The connection of the stage 240 is now described, it being understood that the remaining stages 250, 260 and 270 include corresponding components listed in parenthesis which are connected in the same manner. The Q output of the latch 242 (252, 262, 272) is provided to the non-inverting input of an amplifier 243 (253, 263, 273), having its output connected to the gate of a metal oxide semiconductor field-effect transistor (MOSFET) 245 (255, 265, 275) and to the inverting input of another amplifier 244 (254, 264, 274). The output of the amplifier 244 is provided to the gate of another MOSFET 246 (256, 266, 276) and to the inverting input of the amplifier 243. The Q* output of the latch 242 is provided to the non-inverting input of amplifier 244. The drain of the MOSFET 246 is connected to the source of the MOSFET 245 and to one end of a power inductor 247 (257, 267, 277). The source of the MOSFET 246 is connected to ground, and the drain of the MOSFET 245 receives the $V_{IN}$ signal. The other end of the inductor 247 provides the $V_{OUT}$ signal, which is coupled across a load capacitor 280 to ground. One end of each of the output inductors 247, 257, 267 and 277 are connected together for collectively providing the $V_{OUT}$ signal.

Although not explicitly shown, the amplifiers 243 and 244 are cross-coupled in a break-before-make fashion so that one of the amplifiers is turned off before the other is turned on. This could be achieved using diodes coupled in both feedback paths. Thus, each time the latch 242 toggles, the activated amplifier is turned off before the other is turned on, etc. This break-before-make connection assures that the $V_{IN}$ signal is never coupled directly to ground.

Each of the remaining stages 250, 260 and 270 include similar latches 252, 262, 272 and are coupled to corresponding cross-coupled amplifiers 253 and 254, 263 and 264, and 273 and 274, respectively, further coupled to MOSFETs 255 and 256, 265 and 266, and 275 and 276 for switching through corresponding output inductors 257, 267 and 277, respectively, in a similar manner as described for the stage 240.

The $V_{OUT}$ signal is provided through a feedback circuit 290 for providing the $V_E$ signal. In particular, the $V_{OUT}$ signal is provided to one end of a resistor 291, having its other end coupled to one end of a resistor 292, having its other end connected to ground, where the junction of this voltage divider is provided to the inverted input of an error amplifier 295. The non-inverting input of amplifier 295 receives a reference signal $V_{REF}$ and asserts the $V_E$ signal at its output. A filter comprising a resistor 293 and capacitor 294 is coupled in series between the $V_{OUT}$ signal and the inverting input of the amplifier 295. A feedback resistor 296 is coupled between the inverting input of amplifier 295 and its output. Also, a resistor 297 and a capacitor 298 are coupled in series between the inverting input and output of the amplifier 295.

Figure 3:
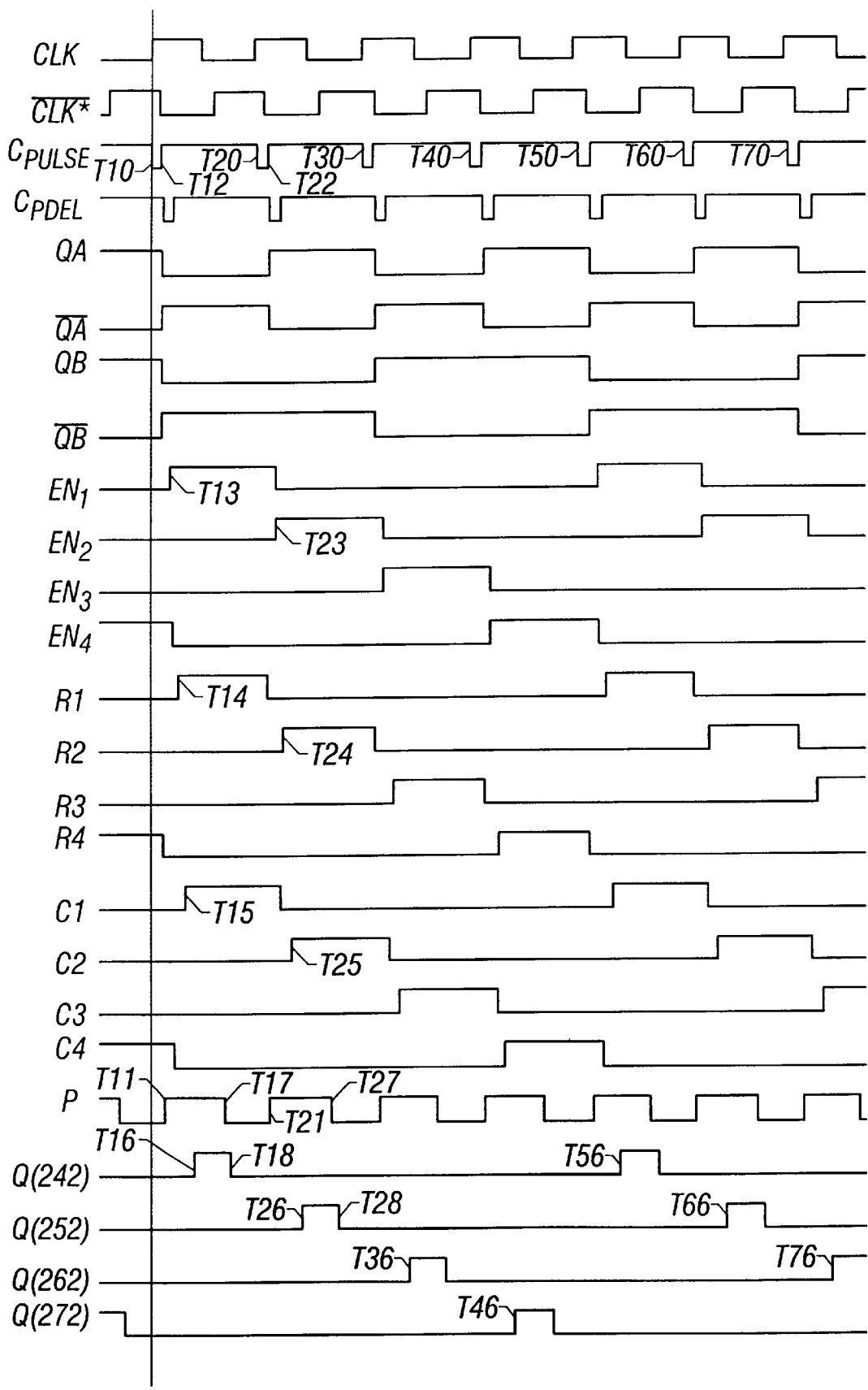
FIG. 3 is a timing diagram illustrating operation of the regulator of FIG. 2.

Operation of the regulator 200 is now described with reference to the timing diagram shown in FIG. 3. The CLK and CLK* signals are shown first. The $C_{PULSE}$ signal is primarily asserted high but asserted low for a delay period through the inverter 202 while both CLK and CLK* are asserted high. The delay through the inverter 202 is emphasized in FIG. 3 for purposes of illustration and is typically much shorter in an actual embodiment. In fact, most of the delays through logic gates are emphasized for illustration, but are otherwise negligible. In FIG. 3, the Q output of both flip-flops 221, 222 are then shown, followed by the $EN_1$, $EN_2$, $EN_3$ and $EN_4$ enable signals. Then the R1, R2, R3 and R4 reset signals are shown, followed by the C1, C2, C3 and C4 clock signals. Finally, the P signal is shown followed by the non-inverted Q outputs of the latches 242, 252, 262 and 272.

When the $C_{PULSE}$ signal is asserted low at time T10, the R1, R2, R3 and R4 signals are asserted low, thereby resetting the latches 242, 252, 262 and 272. This activates or turns on the amplifiers 244, 254, 264 and 274, further turning on the MOSFETs 246, 256, 266 and 276 for coupling one end of each of the inductors 247, 257, 267 and 277 to ground. The amplifiers 243, 253, 263 and 273 and corresponding MOSFETs 245, 255, 265 and 275 are turned off. Thus, all of the stages 240, 250, 260 and 270 are reset once for each CLK cycle. Meanwhile, the $C_{PINV}$ signal momentarily activates FET 214 so that the comparator asserts the P signal high at a time T11.

When the $C_{PULSE}$ is then asserted high at time T12, only one of the four enable signals $E_1^N$, $E_2^N$, $E_3^N$ and $E_4^N$ is asserted throughout the $C_{PULSE}$ cycle through operation of the clock divider circuit 220 and the AND gates 223–226. In the embodiment shown, the enable signals are activated in order, or $E_1^N$, $E_2^N$, $E_3^N$ then $E_4^N$. However, any order for selection or activation of the stages 240, 250, 260 and 270 is contemplated and operation is the same. Assuming the $EN_1$ signal is asserted at time T13, the R1 signal is then asserted high at time T14 after a delay through the gate 227 so that the reset input of the latch 242 is deasserted. Releasing the reset input of the latch 242 effectively selects the stage 240 to allow activation of the MOSFET 245. After the $C_{PDEL}$ signal is asserted, the AND gate 228 asserts the C1 signal at time T15, clocking latch 242 so that its output (Q 242) is asserted high at time T16. The amplifier 244 is then deactivated and the amplifier 243 is then activated so that the MOSFET 245 couples the inductor 247 to the $V_{IN}$ signal, beginning a power portion of the cycle. The $C_{PULSE}$, $C_{PDEL}$ and $EN_1$ signals remain asserted throughout the cycle to thereby enable stage 240 as long as the P signal remains asserted. It is noted that the inverters 204, 205 place a slight delay between the R1 and C1 signals to assure that the latch 242 is released from reset state before being clocked.

The PWM circuit 210 eventually negates the P signal at time T17 when the ramp input to the comparator 211 becomes equal to the $V_E$ signal, thereby resetting the latch 242. This initiates the flux reversal portion of the cycle, where the Q (242) output is de-activated thereby turning off the amplifier 243 and turning on the amplifier 244, allowing current to flow through the inductor 247 and the MOSFET 246 to ground. The remaining latches 252, 262 and 272 remain reset so that the inductors 257, 267 and 277 are not switched throughout the entire cycle, so that only the stage 240 was activated in the given clock cycle.

In the next cycle of the CLK signal, the $C_{PULSE}$ signal is deasserted at time T20, thereby resetting each of the stages 240, 250, 260 and 270, and the P signal is reasserted at time T21. After the $C_{PULSE}$ signal is once again asserted at time T22, the $EN_2$ signal is asserted at time T23, thereby asserting the R2 signal at time T24 to pull latch 252 out of its reset state. After the $C_{PDEL}$ signal is asserted, the clock signal C2 is asserted at time T25, thereby clocking latch 252 which asserts its Q (252) output high at time T26. In a similar manner described previously, MOSFET 255 couples the inductor 257 to the $V_{IN}$ signal for the power portion of the present cycle, providing current to the capacitor 280. When the P signal is eventually negated in the present cycle at time T27 by the PWM circuit 210, the MOSFET 255 is turned off and the MOSFET 256 is turned on for the flux reversal portion, allowing current flow through the inductor 257 and MOSFET 256 to ground. Operation continues in like manner so that the stage 260 and 270 are activated in the following consecutive cycles of the CLK and $C_{PULSE}$ signals, beginning at times T30, T40, respectively, in a similar manner as described above.

In this manner, only one of the stages 240, 250, 260 and 270 are activated for any given CLK signal, thereby reducing the effective frequency of operation for each of the MOSFETs 245 and 246, 255 and 256, 265 and 266, 275 and 276, as well as reducing the frequency of the inductors 247, 257, 267 and 277. This is shown in FIG. 3 with reference to the Q (242, 252, 262 and 272) outputs being sequentially asserted on consecutive cycles of the CLK signal. This substantially reduces the losses associated with the MOSFETs and inductors for each stage, since power loss is directly proportional to the frequency of operation of these switching components.

Nonetheless, the regulator 200 derives the benefit of high frequency at the output resulting in low ripple voltage since the stages are coupled together at the output. Thus, the output capacitor 280 sees the effective combined frequency of the stages 240, 250, 260 and 270, which is approximately equal to the frequency of the CLK signal, thereby allowing the output capacitor 280 to be smaller in capacitance and size.

In the preferred embodiment, the $V_{OUT}$ signal is regulated at 3.3V capable of providing 20 amps, where each of the stages 240, 250, 260 and 270 each provide an average current of 5 amps. The input voltage $V_{IN}$ ranges between 5–7V, resulting in an overall power output of 66 watts for the regulator 200. It is further noted that the size of the switching elements are substantially reduced, so that the entire regulator can be implemented in a package of less than one cubic inch, resulting in a power density of at least 66 watts per cubic inch in the preferred embodiment. This is a substantial improvement over typical regulators, which have a power density on the order of 10 watts per cubic inch.

It is now appreciated that a multiple stage synchronous regulator according to the present invention reduces frequency stress and power loss in each stage as compared to a single-stage regulator. Time sharing of several stages reduces the average current per stage and allows increased utilization of the switching parts in each stage. Thus, the switching transistors and inductors may be replaced with significantly smaller, lighter and less expensive components. The benefits of higher frequency at is still achieved since the stages are coupled together at the output across a single output capacitor. The output capacitor sees the combined frequency of all of the stages, and thus may be significantly smaller than a capacitor that might otherwise be used for an individual stage. Since each of the components in each stage may be pushed past rated limits, the combined frequency may be increased, thereby further reducing the size and cost of the output load capacitor.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A controller for a power converter including a plurality of switch stages, at least one of the plurality of switch stages having a first switch and a second switch, the controller comprising:

a latch operable to receive an oscillator signal and to provide an activating signal for alternately activating the first switch and the second switch depending on the clock signal;

a comparator coupled to the latch, and operable to provide the oscillator signal depending upon a comparison of a clock signal and an error signal; and an error amplifier coupled to the comparator, and operable to sense an output voltage and provide an error signal depending upon the output voltage.

2. The controller of claim 1 further comprising:

a second latch operable to receive a second oscillator signal and to provide a second activating signal for alternately activating a first switch and a second switch of another one of the plurality of switch stages.

3. The controller of claim 2 wherein the comparator is further coupled to the second latch, and operable to provide the second oscillator signal to the second latch.

4. The controller of claim 3 wherein the oscillator signal and the second oscillator signal are substantially the same signal.

\* \* \* \* \*